United States Patent [19]
Sainsbury, Jr.

[11] Patent Number: 4,936,728
[45] Date of Patent: Jun. 26, 1990

[54] CURTAIN AND WINDOW HARDWARE HAVING THREADED ENGAGEMENT MEMBERS

[76] Inventor: Arthur W. Sainsbury, Jr., 103 Pine St., South Easton, Mass. 02373

[21] Appl. No.: 227,360

[22] Filed: Aug. 2, 1988

[51] Int. Cl.[5] .......................................... F16B 23/00
[52] U.S. Cl. .................................. 411/403; 411/919; 248/268
[58] Field of Search ............... 411/403, 404, 405, 410, 411/919; 248/267, 268, 262, 264

[56] References Cited

U.S. PATENT DOCUMENTS

| | | | |
|---|---|---|---|
| 327,378 | 9/1885 | Brouner | 248/268 |
| 926,399 | 6/1909 | Fleming | 248/268 |
| 1,291,850 | 1/1919 | Grigsby | 248/268 |
| 1,332,794 | 3/1920 | Boland | 248/268 |

*Primary Examiner*—Neill R. Wilson

[57] ABSTRACT

A window shade holder which has a slot member and an aperture member. Both the aperture member and the slot member may be formed with solid body portions from which an integral screw extends. The aperture member and the slot member may also be formed with hollow body portions which utilize a bridge element from which an integral screw extends.

3 Claims, 1 Drawing Sheet 4,936,728

CURTAIN AND WINDOW HARDWARE HAVING THREADED ENGAGEMENT MEMBERS

BACKGROUND OF THE INVENTION

This invention relates to curtain hardware.

SUMMARY OF THE INVENTION

The improved curtain hardware utilizes an integral attachment means, such as a threaded member.

BRIEF DESCRIPTION OF THE DRAWINGS

Further details are explained below with the help of the example(s) illustrated in the attached drawings in which.

DESCRIPTION OF THE PREFERRED EMBODIMENT(S)

Figure 1:
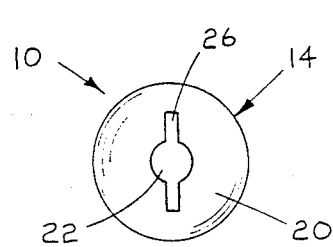
FIG. 1 is a top plan view of an aperture member according to the present invention.
Figure 2:
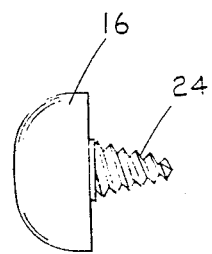
FIG. 2 is a side elevational view of the aperture member shown in FIG. 1.
Figure 3:
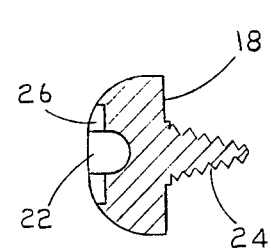
FIG. 3 is a sectional view of the aperture member shown in FIG. 1.
Figure 8:
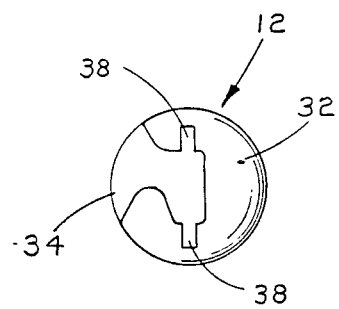
FIG. 8 is a top plan view of a slot member according to the present invention.
Figure 9:
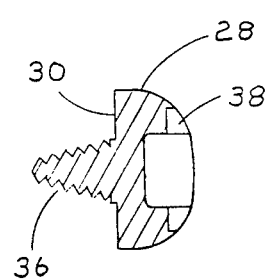
FIG. 9 is a sectional view of the slot member shown in FIG. 8.
Figure 10:
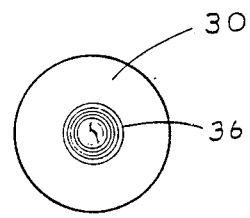
FIG. 10 is a bottom plan view of the slot member shown in FIG. 8.

There is shown in the drawings at FIGS. 1-3 and FIGS. 8-10 curtain hardware and more specifically a window shade holder 10 comprising a slot member 12 and an aperture member 14. The aperture member 14 includes a solid dome-like base portion 16 and a vertical axis. The base portion 16 has a base 18 which is in right angle relation to the vertical axis of the aperture member 14. The base portion 16 includes a first upper portion 20. The first upper portion 20 having a blind hole 22 formed in coaxial relation to the vertical axis. An integral externally threaded, screw like first engagement portion 24 extends from the base 18 and has a longitudinal axis. The longitudinal axis coaxially aligned with the vertical axis of the base portion. A first slot 26 traverses the hole 22.

The slot member 12 comprises an arced, solid dome portion 28. The dome portion 28 includes a second base 30, a second vertical axis and a second upper portion 32. The second base 30 is positioned in right angle relation to the second vertical axis of the dome portion 28. The second upper portion 32 has an engagement slot 34 formed therein and the second base 30 has an externally threaded, screw like second engagement portion 36 extending therefrom. The second engagement portion 36 having a second longitudinal axis which is in coaxial aligned relation with the second vertical axis of the dome portion 28. A second slot 38 transverses the engagement slot 34.

Figure 4:
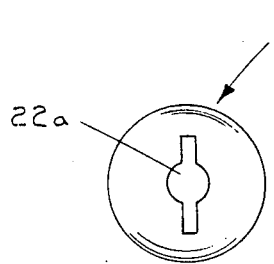
FIG. 4 is a top plan view of a variation of the aperture member shown in FIG. 1 according to the present invention.
Figure 5:
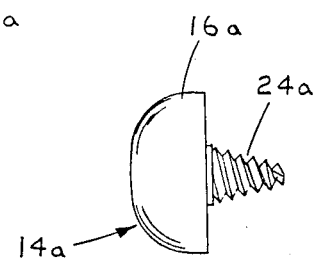
FIG. 5 is a side elevational view of the aperture member shown in FIG. 4.
Figure 6:
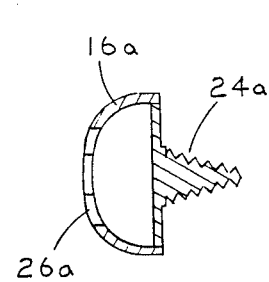
FIG. 6 is a sectional view of the aperture member shown in FIG. 4.
Figure 7:
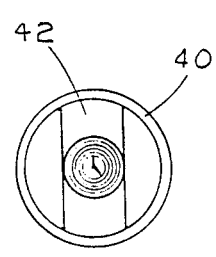
FIG. 7 is a bottom plan view of the aperture member shown in FIG. 4.
Figure 11:
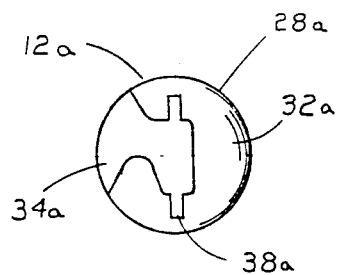
FIG. 11 is a top plan view of a variation of slot member shown in FIG. 8 according to the present invention.
Figure 12:
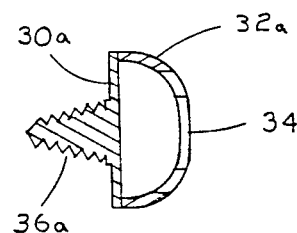
FIG. 12 is a sectional view of the slot member shown in FIG. 11.
Figure 13:
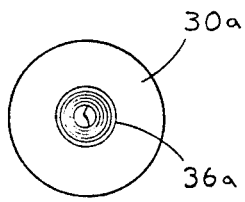
FIG. 13 is a bottom plan view of the slot member shown in FIG. 8.

There is shown in the drawings at FIGS. 4-7 and FIGS. 11-13 a variation of the window shade holder 10 namely the window shade holder 10a comprising a slot member 12a and an aperture member 14a. The aperture member 14a includes a hollow, dome-like base portion 16a. The base portion 16a having an open end defined by a first peripheral edge 40. A bridge element 42 extending from a first section of the peripheral edge 40 across the opening to a second section of the peripheral edge 40 opposite the first said section. The base portion 16a has a vertical central axis and includes a third upper portion 20a. The bridge element 42 is positioned in right angle relation with the vertical central axis and the bridge element 42 has an externally threaded, screw like third engagement portion 24a extending therefrom. The third engagement portion 24a has a second longitudinal axis which is in coaxial aligned relation with the vertical central axis of the base portion 16a. The base portion 16a has a through hole formed in the third upper portion 20a in coaxial relation to the vertical axis of the base portion 16a. A third slot 26a traverses the hole 22a.

The slot member 12a comprises an arced, hollow dome portion 28a. The dome portion 28a includes a third base 30a, a second vertical axis and a fourth upper portion 32a. The third base 30a is positioned in right angle relation to the second vertical axis of the dome portion 28a. The fourth upper portion 32a has an engagement slot 34a formed therein and the second base 30a has an externally threaded, screw like second engagement portion 36a extending therefrom. The second engagement portion 36a having a second longitudinal axis which is in coaxial aligned relation with the second vertical axis of the dome portion 28a. A third slot 38a transverses the engagement slot 34a. A fourth slot 38a transverses the engagement slot 34a.

The pair of window shade holders 10 or its variation 10a can now be mounted on the opposite sides of a window frame, in the usual manner, by inserting a tool, a screwdriver for example, in the slots 26, 26a, 38 or 38a and driving the engagement portion into the frame.

What I claim is:

1. A shade holder 10a comprising a slot member 12a and an aperture member 14a, the aperture member including a hollow, dome-like base portion 16a, defined by a peripheral wall, the base portion having an open end defined by a first peripheral edge 40, a bridge element 42 extending from a first section of the peripheral edge across the open end to a second section of the peripheral edge opposite the first section, the base portion having a vertical central axis, the bridge element positioned is right angle relation to the vertical central axis and having an externally threaded, screw like third engagement portion 24a extending therefrom, the base portion having a through hole formed therein in coaxial relation to the vertical axis of the base portion, the slot member 12a comprising an arced, hollow dome portion 28a, the dome portion including a base 30a, a second vertical axis and an upper portion 32a, the base positioned in right angle relation to the second vertical axis of the dome portion, the upper portion having an engagement slot 34a formed therein and the base having an externally threaded, screw like second engagement portion 36a extending therefrom, the second engagement portion having a second longitudinal axis in coaxial aligned relation with the second vertical axis of the dome portion, a third slot 38a transversing the engagement slot and the engagement slot 34a extending radially in the dome portion 16a.

2. A shade holder as setforth in claim 1 further comprising a third slot traversing the hole.

3. A shade holder as setforth in claim 1 wherein the dome portion of the slot member and the base portion of the aperture member being solid.

* * * * *